Dec. 1, 1970  R. T. KING  3,544,879
COMMUTATING CIRCUIT FOR AN INVERTER HAVING CONTROLLED RECTIFIERS
Filed March 11, 1969  2 Sheets-Sheet 2

INVENTOR.
Raymond T. King
BY
Robert W. Smith
ATTORNEY

United States Patent Office 3,544,879
Patented Dec. 1, 1970

3,544,879
COMMUTATING CIRCUIT FOR AN INVERTER HAVING CONTROLLED RECTIFIERS
Raymond T. King, Santa Barbara, Calif., assignor to General Motors Corporation, Detroit, Mich., a corporation of Delaware
Filed Mar. 11, 1969, Ser. No. 806,160
Int. Cl. H02m 7/52; H02p 7/28
U.S. Cl. 321—5               3 Claims

ABSTRACT OF THE DISCLOSURE

In a preferred form, a controlled rectifier inverter circuit for an A.C. motor power supply has a commutating circuit including a commutating capacitor and an arrangement of shut-off controlled rectifiers for applying reverse turn-off voltages across power controlled rectifiers of the inverter. A first diode circuit including a series connected inductor is connected to the commutating circuit to provide a voltage clipping path which reduces reactive voltage spikes which are otherwise developed across the load and portions of the inverter circuit. A second diode circuit is connected between the load circuit and the shut-off controlled rectifiers to return reactive current to the load circuit and also to limit recharging of the commutating circuit by the reactive current energy.

---

This invention relates to an inverter power supply for inductive loads and more particularly to an improved commutating circuit of an inverter having controlled rectifiers that supply a polyphase induction motor from a direct current source.

This application is an improvement of the inverter circuit disclosed and claimed in copending application S.N. 589,928, for a Power Supply System, by Richard W. Johnston, filed Oct. 27, 1966 and assigned to the assignee of this invention.

Generally, power inverter circuits using power controlled rectifiers for supplying alternating current from a direct current source to an electrical load require a commutating circuit utilizing additional shut-off controlled rectifiers to apply a reverse turn-off voltage across the power controlled rectifiers. The power ratings of the controlled rectifiers are often either a limitation of the maximum voltages and currents which can be supplied to the electrical load or cause the expense of such circuits to increase substantially with the use of controlled rectifiers having higher power ratings. Also, the size and expense of inverter circuits increases with the number of circuit elements required.

An arrangement of power controlled rectifiers forming the power conducting portion of inverter circuits is generally fixed by the type of electrical load and the form in which voltage and current are to be supplied to the load. Therefore, primary attempts to improve inverter circuits are directed to design of a commutating circuit which is more efficient and which requires fewer circuit elements. The general requirements for a commutating circuit of an inverter supplying an inductive electrical load are: (1) to apply sufficient reverse voltage to turn off the power controlled rectifiers, (2) to control the charging and discharging of a commutating capacitor, (3) to prevent excessive voltages and currents from being developed which will damage the controlled rectifiers or the load during the turn-off operation and (4) to utilize reactive energy developed so that it is used to either recharge the commutating capacitor or to return the reactive energy to the load thereby conserving the energy of the inverter direct current source.

In the inverter circuit of this invention the power and shut-off controlled rectifiers and the commutating capacitor circuit are connected together to form a circuit arrangement corresponding to the inverter circuit described in the aforementioned application S.N. 589,928, filed Oct. 27, 1966 and assigned to the assignee of this invention. The inverter circuit arrangement includes first and second groups of power controlled rectifiers which are connected respectively between opposite poles of a direct current source and the input of a polyphase inductive load. A power controlled rectifier of one group is gated conductive with a power controlled rectifier of the other group in a sequence which develops alternating current voltage across the inverter output. The alternating current voltage is formed by opposite polarity power pulses which are developed alternately across each phase winding of the load. One controlled rectifier of a conducting pair of power controlled rectifiers is turned off to end each power pulse. A reverse voltage is applied across the power controlled rectifier to render it nonconducting when a shut-off controlled rectifier is turned on to discharge the commutating capacitor.

In the above-mentioned application, a diode and an inductor are connected in series to one end of the commutating capacitor and across each individual power controlled rectifier. The diode is poled so that it has an opposite polarity to the forward polarity of the power controlled rectifier. The voltage rise in the commutating circuit following turn-on of the shut-off controlled rectifier may cause the voltage developed across the load circuit and other controlled rectifiers of the inverter to become excessive. Accordingly, the diode-inductor circuit provides a shunt path to bypass part of the commutating circuit voltage in a circuit path parallel to the power controlled rectifier being turned off. Also because of the inductive impedance of the load, reactive load current tends to continue flowing following turn-off of the power controlled rectifier. Therefore, a current conductive path for the reactive load current is provided by a diode-inductor circuit connected in parallel with the power controlled rectifier of a conducting pair that continues conducting.

Each of the diode-inductor circuits of the aforementioned application provide two functions. First, during one cycle of the turn-off operation the reactance of the inductor stores part of the excess voltage which bypasses the controlled rectifiers so that they are protected. Secondly, during another part of the turn-off cycle of operation, a reactive current path is provided in which the value of the reactance of the inductor determines the amount of reactive energy of the inductive load which is used to recharge the commutating capacitor.

In the inverter circuit of the present invention two pairs of diode circuits each including a series connected inductor are provided rather than individual diode-inductor circuits for each power controlled rectifier. Each pair of diode circuits is respectively connected between one end of the commutating capacitor and one of the opposite polarity terminals of the inverter direct current source. A first diode circuit of each circuit pair controls the amount of voltage which bypasses the inverter controlled rectifiers. Otherwise, the forward current limit and maximum forward blocking voltage characteristics of different controlled rectifiers of the inverter may be exceeded. The second diode circuit of each pair provides a path to return the reactive current to the load following turn-off of a power controlled rectifier. This circuit provides a current path through the other controlled rectifier of the conducting pair to continue reactive current flowing to the load. The inductance of the inductor in the second diode circuit determines the amount of reactive load energy utilized in recharging the commutating capacitor. The remaining reactive current is recirculated through the load. The first and second diode circuits of each pair of circuits provide respectively the same operation during the turn-off cycle of operation of each power controlled rectifier. Accordingly, the amount of clipped voltage which bypasses the commutating circuit is determined independently of the amount of reactive current energy used to recharge the commutating capacitor.

One of the objects of this invention is to provide a controlled rectifier inverter circuit with means for preventing excessive voltages and currents from being applied to the controlled rectifiers.

Another object of this invention is to provide a controlled rectifier inverter wherein a reactive load current path is provided which is independent from the circuit path provided to prevent excessive voltages developed from the commutating capacitor discharge.

A further object of this invention is to provide a commutating circuit for a controlled rectifier inverter with a clipping voltage circuit and a reactive load current return circuit which are utilized when each of a plurality of power rectifiers of one group of power controlled rectifiers is being turned off.

A further object of this invention is to provide a controlled rectifier which is utilized to supply a polyphase induction motor from a direct current power source in which a first and a second pair of diode-inductor circuits are utilized to separately control the amount of voltage developed across the controlled rectifiers during discharge of the commutating capacitor and the amount of reactive load current which is proportioned between recharging of the commutating capacitor and the current which is returned to the load.

Further objects and advantages of the present invention will become apparent from the following description, reference being had to the accompanying drawings wherein a preferred embodiment of the present invention is clearly shown.

Figure 1:
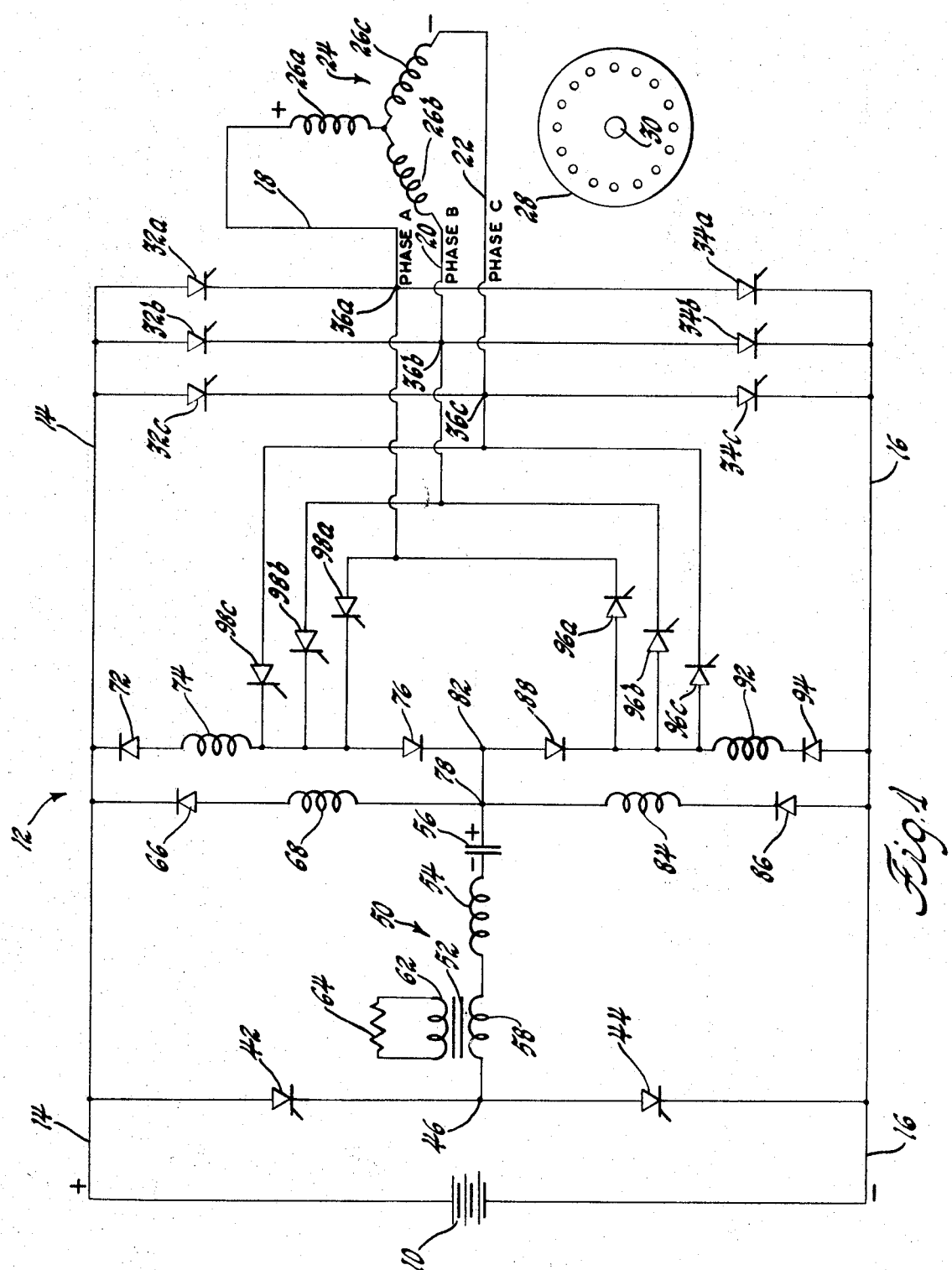
FIG. 1 is a schematic circuit diagram of an inverter including commutating circuit made in accordance with this invention.

Referring now to the drawings and more particularly to FIG. 1, the reference numeral 10 designates a source of direct current which is illustrated as a battery, but also may include a fuel cell or a dynamoelectric generator machine. The source of direct current 10 is connected to the inverter circuit of this invention, generally designated by the numeral 12, by D.C. power conductors designated 14 and 16. The power conductor 14 is connected to the positive terminal of the direct current source 10 and the power conductor 16 is connected to the negative terminal.

The inverter circuit 12 supplies polyphase alternating-current voltage across A.C. power conductors designated 18, 20 and 22. These conductors are connected to a polyphase inductive load comprising a polyphase squirrel cage induction motor 24 having three phase Y-connected windings designated 26a, 26b and 26c. Caged rotor 28 of the motor 24 is mounted on rotor shaft 30 which is connected in driving relationship to a load, not shown.

A first group of three power controlled rectifiers 32a, 32b and 32c and a second group of three power controlled rectifiers 34a, 34b and 34c are connected between the positive and negative power conductors 14 and 16. The three controlled rectifiers 32a, 32b and 32c are referred to hereinafter as positive power controlled rectifiers. These controlled rectifiers have each anode electrode connected to the positive power conductor 14. The cathode electrodes are respectively connected in series with the anode electrodes of power controlled rectifiers 34a, 34b and 34c. The controlled rectifiers 34a, 34b and 34c are referred to hereinafter as negative power controlled rectifiers and the cathode electrodes of these controlled rectifiers are connected to the negative power conductor 16. All of the controlled rectifiers described herein are semiconductor switching devices of the silicon controlled rectifier (SCR) type having conventional cathode, anode and gate electrodes, and are capable of conducting large values of current.

Junctions 36a, 36b and 36c formed respectively between the series connected controlled rectifiers 32a–34a, 32b–34b and 32c–34c form the output terminals of the inverter circuit. The junctions 36a, 36b and 36c are further connected respectively to the A.C. power conductors 18, 20 and 22 which are respectively connected to the outer ends of the motor phase windings 26a, 26b and 26c. The inner ends of the phase windings are connected together to complete the three phase Y-connection.

The inverter circuit 12 further includes a commutating circuit arrangement to produce a reverse turn-off voltage across a power controlled rectifier at the end of its conduction period. Controlled rectifiers 42 and 44, referred to hereinafter as positive and negative switching controlled rectifiers, are connected in series across the positive and negative power conductors 14 and 16. The anode of positive switching controlled rectifier 42 is connected to the positive power conductor 14 and the cathode electrode of negative switching controlled rectifier 44 is connected to the negative power conductor 16. Junction 46 formed between the switching controlled rectifiers 42 and 44 is connected to one end of a commutating capacitor circuit generally designated 50.

The commutating capacitor circuit 50 includes a saturable core inductor 52, inductor 54 and a commutating capacitor 56. The saturable core inductor 52 includes a ferrite core having wound thereon a primary transformer winding 58. The primary winding 58 is connected in series between the junction 46 and the left end of inductor 54. A secondary transformer winding 62 which has a resistor 64 connected across its ends is also wound on the core of saturable inductor 52. The saturable core inductor 52 is provided to prevent an excessive rate of initial current rise as described more fully hereinbelow.

The commutating capacitor 56 is connected in series with the right end of the inductor 54. The capacitor 56 and inductor 54, along with other inductances described hereinbelow, form a resonant circuit having a ringing time which determines the rate of charging and discharging of the capacitor 56.

The right end of commutating capacitor 56 is connected to a first diode circuit including series connected diode 66 and inductor 68 and to a second diode circuit including a series connection of diode 72, inductor 74 and diode 76. The first and second diode circuits form a pair of diode circuits connected respectively at junctions 78 and 82 between the right end of capacitor 56 and the positive power conductor 14. The lower end of inductor 68 is connected to the junction 78 and the upper end of inductor 68 is connected to the anode of diode 66. In the second diode circuit, the cathode of diode 76 is connected to the junction 82 and the anode is connected to the lower end of inductor 74. The upper end of the inductor 74 is connected to the anode of diode 72.

A further pair of diode circuits, which correspond respectively to the first pair of diode circuits, are connected between the right side of commutating capacitor 56 and the negative power conductor 16. Correspondingly, a diode circuit including inductor 84 and diode 86 is connected with the upper end of inductor 84 connected to the junction 78 and the lower end connected to the cathode of diode 86. The second diode circuit of the second pair of diode circuits includes a diode 88 having the anode connected to the junction 82 and its cathode connected to the upper end of inductor 92. The lower end of inductor 92 is connected to the cathode of a diode 94 which has its anode connected to the negative power conductor 16.

Three shut-off controlled rectifiers 96a, 96b and 96c, referred to as positive shut-off controlled rectifiers, are connected at their respective cathodes to the respective cathodes of positive power controlled rectifiers 32a, 32b and 32c. The anode electrodes of the shut-off controlled rectifiers 96a, 96b and 96c are connected between diode 88 and inductor 92. Similarly, three shut-off controlled rectifiers 98a, 98b and 98c, referred to as negative shut-off controlled rectifiers, are connected from their respective anodes to the respective anodes of negative power controlled rectifiers 34a, 34b and 34c. The cathodes of the negative shut-off controlled rectifiers are connected between inductor 74 and diode 76. Each shut-off controlled rectifier is triggered conductive to turn off the power controlled rectifier to which it is connected in the manner described in detail hereinbelow.

The controlled rectifiers described above receive suitable triggering voltage pulses which are applied to the gate electrodes from a logic or gating circuit, not shown. The trigger signals turn on the controlled rectifiers in a switching sequence described further hereinbelow. The controlled rectifiers continue conducting after the triggering signal has been removed and continue conducting for as long as the current is maintained above the holding current level. This current level is the minimum value of forward current required to maintain the controlled rectifier in the conducting state. To turn off the power controlled rectifiers quickly, the forward current is brought below the holding current level and then is reversed by a reverse voltage applied across the power controlled rectifier. When reverse current begins, the power controlled rectifier regains its blocking or nonconducting state so that the power controlled rectifier returns to the forward blocking voltage condition.

Figure 2:
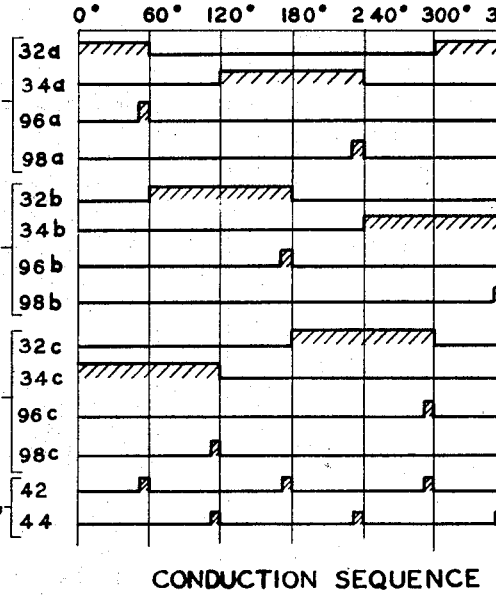
FIG. 2 is a chart illustrating the conduction sequence of the controlled rectifiers illustrated in FIG. 1.

In FIG. 2 a chart illustrates the conduction sequence of the controlled rectifiers illustrated in FIG. 1. The chart indicates the conducting times of each of the controlled rectifiers to develop a complete cycle (360 electrical degrees) of three phase output current having phases A, B and C. During each sixty electrical degree period one of the positive power controlled rectifiers 32a, 32b or 32c is gated conductive along with one of the negative power controlled rectifiers 34a, 34b or 34c. During each sixty electrical degree period a different pair of power controlled rectifiers are conducting. For example, at the beginning of the first sixty electrical degree period, the power controlled rectifiers 32a and 34c are gated conductive to connect the battery 10 across the motor phase windings 26a and 26c. Positive phase A current passes from the positive power conductor 14 through positive power controlled rectifier 32a, junction 36a, conductor 18 and enters the outer end of winding 26a. The return current flow provides negative phase C current which passes through the inner end of winding 26c, the conductor 22, junction 36c, negative power controlled rectifier 34c to the negative power conductor 16. The controlled rectifiers 32a and 34c form the pair of power conducting controlled rectifiers for the first sixty electrical degrees. The subsequent sixty degree periods are formed by the designated pair of positive and negative power controlled rectifiers being gated to a conductive state.

Referring further to the conduction sequence chart of FIG. 2, there is indicated the instants at which the respective shut-off and switching controlled rectifiers are gated conductive to turn off one of the power controlled rectifiers at the end of each sixty electrical degree period. For example, the power controlled rectifier 32a is turned off by gating the switching controlled rectifier 42 and the shut-off controlled rectifier 96a conductive at the end of the first sixty degree period.

Accordingly, each power controlled rectifier is conductive during a 120 electrical degree period of each power cycle. Alternate polarity power pulses are developed when each phase current passes through the respective motor phase windings such that it has one polarity for 120 degrees, is off for sixty electrical degrees, and then has a reverse polarity for 120 electrical degrees. The amount of power supplied to the motor windings can be controlled by means which do not form a part of this invention, for example, by varying the current conduction period through the motor phase windings for less than the maximum 120 electrical degree period or modulating the power output of the direct current source 10.

Referring now to the operation of the inverter circuit of this invention, wherein the operation is initially started by the controlled rectifiers being triggered conductive in a "priming mode" sequence, not shown in FIG. 2. The priming mode sequence develops the initial charge across the commutating capacitor 56. The commutating capacitor 56 is charged in alternate polarities from one pole of the battery 10 through either of the switching controlled rectifiers 42 and 44, one of the shut-off controlled rectifiers, through the motor windings, and one of the power controlled rectifiers to the opposite pole of the battery 10. The capacitor 56 is charged to one polarity and then the opposite six times during one full cycle of the inverter priming mode operation. Accordingly, the commutating capacitor is charged to a potential substantially above battery 10, having a voltage of 500 volts, for example.

The commutating capacitor 56 is charged with a given polarity after the priming mode sequence and at the beginning of each sixty electrical degree period, for example, with the right end positive as indicated in FIG. 1. The capacitance of capacitor 56 is selected so that sufficient energy is stored in the commutating capacitor 56 to turn-off the respective power controlled rectifiers at the end of a sixty electrical degree period. Also, the capacitance of the commutating capacitor must be limited so that it is not charged too high or excessive voltages and currents are developed which will damage the inverter circuit or load. The inductance of inductor 54 as well as the inductance of inductors 68 and 84 is selected so that the discharge time of capacitor 56 is sufficiently long to produce a turn-off reverse current through a power controlled rectifier. In one preferred embodiment, commutating capacitor 56 has a capacitance of approximately fifty microfarads and each of the inductors 54, 68 and 84 has an inductance of eight microhenries.

Figure 3:
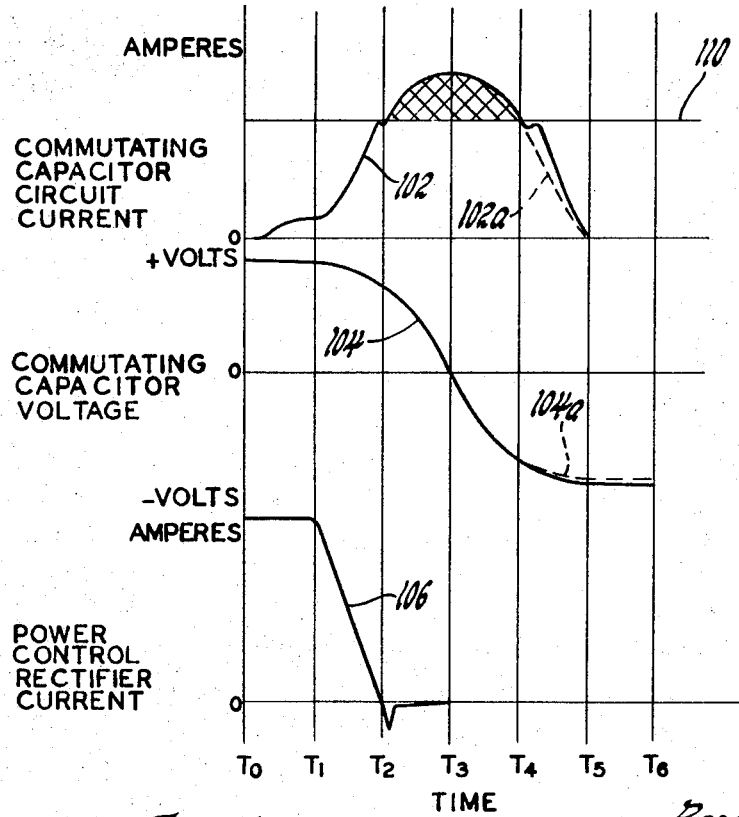
FIG. 3 is an illustration of wave forms developed in the inverter circuit illustrated in FIG. 1, made in accordance with the present invention.

The operation of one complete turn-off cycle will be described with reference to the time graph of wave form curves illustrated in FIG. 3. For purposes of explanation, the designated wave forms are illustrated for the turn-off cycle of a positive power controlled rectifier. Also, the amplitudes of the curves and the time intervals between the beginning at time T0 and the end at time T6 are not shown to scale. The top graph of wave forms illustrates a curve 102 of the current developed in the commutating capacitor circuit 50. The middle graph illustrates a curve 104 of the voltage change across the commutating capacitor 56. The bottom graph illustrates a curve 106 of current through a power controlled rectifier being commutated to the nonconducting state. Corresponding curves having reversed polarities are applicable for the turn-off of the negative power controlled rectifiers.

Starting at the end of the first sixty degree period, the positive power controlled rectifier 32a is turned off by the stored voltage on capacitor 56 in the following sequence. The positive switching controlled rectifier 42 and shut-off controlled rectifier 96a are gated conductive. The controlled rectifier 42 connects the left side of capacitor 56 to the postive pole of battery 10. The controlled rectifier 96a is gated on to provide a current conductive path between the right side of capacitor 56 and junction 36a. The charged potential of the commutating capacitor 56 is approximately 900 volts with the right end positive with respect to the left end in one typical operation.

Initially, a current conductive path is formed from the positive power conductor 14 to the phase windings 26a and 26c through the commutating capacitor circuit 50. This current path includes the ferrite core inductor 52 connected in series with the inductor 54 and the commutating capacitor 56. The inductor 52 requires approximately twenty microseconds for magnetizing current to saturate the ferrite core and place the inductor in a low impedance state. This is illustrated by the portion of the current wave form curve 102 between times T0 and T1. The initial magnetizing current is referred to as a pilot current which is a reduced current which flows prior to the shut-off controlled rectifier 96a becoming fully conductive after receiving a gating signal. Therefore, the inductor 52 provides protection to the controlled rectifier 96a from initial "current inrush" or $di/dt$ protection required to prevent a high current level from being applied too rapidly to the controlled rectifier before it becomes fully conductive. Before the ferrite core of inductor 52 is fully saturated it is in a high impedance state and accordingly has a high voltage drop thereacross. For example, with 900 volts charge across the capacitor 56 there is approximately 899 volts across the ferrite inductor 54 and approximately 1 volt drop across shut-off controlled rectifier 96a. The resistor 64 across the secondary transformer winding 62 increases the pilot current required to saturate the inductor 52 and raises it to a level of approximately twenty amperes. Before the saturation current level is reached a nominal current begins to flow through the semiconductor junctions of the shut-off controlled rectifier 96a.

At time T1 the inductor 52 saturates so that it has a low impedance and does not further affect the current flow as illustrated by curve 102. The current through the commutating capacitor circuit 50 and shut-off controlled rectifier 96a begins to rise rapidly as the shut-off controlled rectifier 96a becomes fully conductive. This is because the current through the commutating capacitor circuit diverts the battery current away from the power controlled rectifier 32a due to the additional potential of the commutating capacitor. The bottom curve 106 of FIG. 3 indicates that the current through the power controlled rectifier begins to drop between times T1 and T2. Initially, the load current level at the beginning of the turn-off cycle is approximately 500 amperes. Also, the commutating capacitor 56 begins to discharge between times T1 and T2 as indicated by voltage curve 104.

A sudden current inrush through inductor 54 at time T2 develops a high reverse voltage across the inductor which is slightly less than the commutating capacitor voltage. As the commutating capacitor continues to discharge and decrease its stored voltage, the rate of change of increasing current through the inductor 54 also decreases. The inductance of inductor 54 is such that it will always develop a reverse voltage slightly less than the commutating capacitor voltage. Accordingly, a positive voltage difference in the commutating capacitor circuit is maintained to continue the shunt path for the load current. It is apparent that the forward current of power controlled rectifier 32a must be brought to zero before the reverse current can occur to turn off the controlled rectifier.

Between time T1 and T2 the voltage across the commutating capacitor circuit 50, and the voltage drops across switching controlled rectifier 42, diode 88 and shut-off controlled rectifier 96a are such that a slightly positive voltage is maintained at the junction 36a. The diodes 76, 86 and 94 are reverse poled to prevent the commutating capacitor circuit current from flowing respectively through inductors 74, 84 and 92. Also, the clipping diode 66 will not be forward poled to conduction until the current through power controlled rectifier 32a is reversed. This is because diode 66 and inductor 68 are connected across a virtual short circuit formed by diode 88 and conductive controlled rectifiers 96a and 32a. Although the voltage between junction 78 and conductor 14 may be slightly in the forward poled direction of diode 66, this potential difference will be below the conduction threshold voltage of the diode 66.

At time T2 the commutating capacitor circuit current curve 102 reaches a level indicated at 110 corresponding to the load current level of approximately 500 amperes. As the voltage drop across controlled rectifier 32a goes to zero and reverses the potential at junction 78 becomes more positive with respect to power conductor 14. The diode 66 of the first diode circuit becomes poled in the forward direction sufficient for it to conduct and provide a clipping or conductive bypass circuit across capacitor 56. This clipping diode circuit provides a conductive path from the right end of capacitor 56 through the inductor 68, the diode 66, conductor 14, the positive switching controlled rectifier 42, and then through primary winding 58 and inductor 54 to the left end of the commutating capacitor 56. The current through the clipping circuit is indicated by the cross-hatched portion of current wave 102 above line 110.

The clipping circuit just described bypasses excessive voltage which otherwise would develop across the motor windings and the nonconductive negative power controlled rectifier 34a. The forward blocking voltage of the controlled rectifier 34a would be exceeded since the 900 volts charge of the commutating capacitor 56 is connected in series with the 500 volts of battery voltage across power conductors 14 and 16 by the controlled rectifiers 42 and 96a. The sum of 1400 volts would be placed across the junction 36a and the negative power conductor 16 and therefore across the outer ends of motor windings 26a and 26c and also across the controlled rectifier 34a. The inductances of the inductors 68 and 54 are both approximately 8 microhenrys, as noted hereinabove, so that the voltage of the commutating capacitor 56 is substantially equally divided across these inductors. With increasing current in the clipping circuit, the counter E.M.F.'s developed across inductors 68 and 54 will have voltage polarities which oppose the voltage across capacitor 56. Approximately 450 volts is developed across each inductor 54 and inductor 68. Therefore, the voltage developed across the motor windings and also the forward voltage across controlled rectifier 34a is reduced to approximately 950 volts.

The amount of voltage developed in the clipping circuit can be varied by changing the value of inductor 68. A different value of inductance will, of course, change the amount of voltage and current developed in the clipping circuit. Also, the inductance must be sufficient so that the ring time of the total circuit inductances and the capacitance of the commutating capacitor 56 will cause a reverse voltage to be maintained across power controlled rectifier 32a and an increasing current flow through the clipping circuit until the controlled rectifier 32a is in a fully forward blocking state at time T3. Accordingly, the commutating capacitor continues discharging until time T3.

At time T3, the voltage across power controlled rectifier 32a goes to zero and reverses as indicated by the current curve 106. A reverse current flows only briefly in controlled rectifier 32a but the reverse voltage across controlled rectifier 32a must be continued for approximately thirty microseconds. This is the time required to render the controlled rectifier fully nonconductive and for it to revert to its forward blocking state.

When the power controlled rectifier 32a becomes fully nonconducting, the commutating capacitor 56 begins recharging to the opposite polarity. The current in the slipping circuit begins decreasing after the commutating capacitor discharges causing the voltage developed across the inductors 54 and 68 to reverse polarity. The inductive energy stored in the inductors causes current to continue flowing in the same direction, i.e. from junction 46 to junction 78, through the commutating capacitor circuit 50. The discharge of the inductors starts the charging of the commutating capacitor in the reverse direction. The current in the clipping circuit continues until time T4 when the diode 66 is reverse poled by junction 78 becoming more negative with respect to conductor 14.

Referring now to the load circuit, at time T3 the current flow into the phase winding 26a stops since the outer terminal of the winding 26a is no longer connected to power conductor 14 through the power controlled rectifier 32a. Voltage due to the reactive inductance of the windings 26a and 26c develops a reverse voltage from that shown in FIG. 1 so that the outer end of winding 26c has a positive polarity relative to the outer end of winding 26a. The diode 94 is poled in the forward direction by the stored inductive load voltage which is connected across inductor 92 and diode 94 by controlled rectifiers 34c and 96a. At this instant reactive load current begins to flow in the same direction as did the load current through the negative power controlled rectifier 34c which remains in the current conducting state and into the second diode circuit including inductor 92 and diode 94 of the lower pair of diode circuits. Reactive current flows back to the motor windings through shut-off controlled rectifier 96a via the junction 36a and the outer end of winding 26a.

The voltage developed across inductor 92 causes additional current from that which would normally flow through the commutating capacitor circuit without the inductor 92. The path of the additional current is from power conductor 16, battery 10, conductor 14, switching controlled rectifier 42, inductor 54, commutating capacitor 56 back through the shut-off controlled rectifier 96a. The inductor 92 develops a voltage potential at the upper end of inductor 92 which is negative relative to the negative potential of conductor 16. Accordingly, the right side of capacitor 56 is recharged to a more negative potential by the amount of additional charging provided by the reactive current energy and the inductance of inductor 92. Also, part of the reactive current is returned to the motor windings because otherwise the commutating capacitor 56 would become charged too high. Thus, by returning the reactive current to the motor during the turn-off cycle the motor energy and battery energy are conserved and the capacitor will not be overcharged.

In the preferred embodiment described herein, the inductor 92 of the lower reactive diode circuit and the inductor 74 of the upper reactive diode circuit, each have an inductance of two microhenries. If the inductance of inductor 92 is made larger, for example, 8 microhenries which is the same as inductor 68, the capacitor 56 becomes too highly recharged. Without the inductor 92, the commutating capacitor 56 would be clamped to the negative potential of conductor 16 which would then be directly connected with the junction 78. Accordingly, if none of the reactive load energy is needed to recharge the commutating capacitor neither of the inductors 74 and 92 is provided in the second or reactive diode circuits associated respectively with each of the clipping diode circuits.

The effect of the reactive current in increasing the current through the commutating capacitor circuit is indicated by the irregular portion of the current curve 102 occurring after time T4. The dashed line of curve 102a indicates the current wave shape if no reactive current energy is used to recharge the commutating capacitor 56. In the later case, the inductors 92 and 74 are removed from the reactive diode circuits and the commutating capacitor 56 becomes charged at a lesser potential as indicated by the dashed line voltage curve 104a.

At the time T5, the commutating capacitor 56 is fully recharged in a reverse polarity from the polarity across the capacitor at the beginning of the turn-off cycle. The total turn-off time interval between times T1 and T5 in FIG. 3 averages between 120–150 microseconds. The positive switching controlled rectifier 42 resumes a blocking state when it is reverse poled by the positive poled voltage at the left end of the commutating capacitor 56.

The shut-off controlled rectifier 96a and diode 94 continue conducting until the reactive current stops at time T6. Also, the negative power controlled rectifier 34c continues conducting and may become nonconductive if the reactive current ends before the next conduction period. The reactive current may continue after the beginning of the next sixty degree period.

In the following sixty electrical degree period, i.e. between sixty and 120 degrees, gating pulses are applied to the gate electrodes of positive power controlled rectifier 32b and again to negative power controlled rectifier 34C. A turn-off cycle of operation is provided for the negative power controlled rectifier 34c at the end of the 120 electrical degree period. The turn-off cycle of controlled rectifier 32c is identical to that described in connection with the graphs of FIG. 3 except that the polarities of the voltage and current curves are reversed. The negative shut-off controlled rectifier 98c is gated conductive along with the negative switching controlled rectifier 44 to turn off the negative power controlled rectifier 34c at the end of the 120 electrical degree time of the conduction sequence. The lower clipping diode circuit including diode 86 and inductor 84 is utilized to bypass the commutating capacitor circuit voltage and current in a corresponding manner as described in connection with the clipping diode circuit including diode 66 and inductor 68. Also, the reactive current return path is provided by the upper reactive diode circuit including diode 72 and inductor 74 in a manner corresponding to the current path provided by diode 94 and inductor 92. The diode 88 connected in series with diode 94 and inductor 92 blocks current flow through the lower reactive diode circuit in the same manner as diode 76 blocks current into the upper reactive current return path.

The invention provides a commutation circuit arrangement having two pairs of diode circuits each including a clipping diode circuit and a reactive diode circuit. The diode circuits of each pair provide the same respective operation for turn-off of each controlled rectifier in the two groups of positive and negative power controlled rectifiers as described for the positive and negative power controlled rectifiers 32a and 34c described hereinabove. Accordingly, improved circuit operation is provided during the inverter turn-off cycle by more efficient use of fewer circuit elements.

While the embodiments of the present invention as disclosed herein constitute a preferred form, it is to be understood that other forms might be adopted.

What is claimed is:

1. An inverter comprising: a pair of input conductors connected to a direct current source; a plurality of pairs of power controlled rectifiers connected across said pair of input conductors, an output junction being formed between each pair of power controlled rectifiers connected to an inductive load, a pair of said output junctions providing a voltage across said inductive load when two of said power controlled rectifiers of different pairs are triggered conductive; a commutating capacitor for developing a reverse turn-off discharge voltage across each power controlled rectifier; a pair of switching controlled rectifiers series connected between said pair of input conductors, a junction formed between said pair of switching controlled rectifiers connected with one end of said commutating capacitor; first and second groups of oppositely poled shut-off controlled rectifiers, said first group of shut-off controlled rectifiers having common ends of one polarity connected together and said second group having common ends of the other polarity connected together with said commonly connected ends of both groups connected with the second end of said commutating capacitor, and the opposite end of one shut-off controlled rectifier included in said first group connected to the opposite end of one shut-off controlled rectifier of said second group and to one of said output junctions; a first voltage clipping circuit including a first diode series connected to a first inductor, said first voltage clipping circuit connected between the second end of said commutating capacitor and one of said input conductors with said first diode poled to conduct when the commutating capacitor discharges in one direction; a second voltage clipping circuit including a second diode series connected to a second inductor, said second voltage clipping circuit connected between said second end of said commutating capacitor and the other of said input conductors with said second diode poled to conduct when the commutating capacitor discharges in an opposite direction, whereby said first and second voltage clipping circuits alternately provide conductive paths to bypass predetermined values of voltages and currents; a third diode; means connecting said third diode between the common connection of said first group of shut-off controlled rectifiers and one of said pair of input conductors; a fourth diode; means connecting said fourth diode between the common connection of said second group of shut-off controlled rectifiers and the other of said input conductors; said third and fourth diodes each included in a plurality of circuit paths for conducting reactive current developed in said inductive load when one of two conductive power controlled rectifiers is turned off wherein each circuit path includes said inductive load, the other conductive power controlled rectifier, either of said third and fourth diodes, and a shut-off controlled rectifier.

2. An inverter for supplying multiphase alternating current inductive load, comprising: first and second input conductors adapted to be connected to a direct current source; a plurality of pairs of power controlled rectifiers being series connected between said first and second input conductors, each pair of power controlled rectifiers including an intermediate junction forming an inverter output terminal; first and second switching controlled rectifiers serially connected between said first and second input conductors and forming a junction therebetween; a commutating circuit including a capacitor serially connected to a first inductor, one end of said commutating circuit connected to said junction formed between said first and second switching controlled rectifiers; first and second voltage clipping circuits respectively connecting the other end of said commutating circuit with said first and said second input conductors, said first voltage clipping circuit including a first diode connected in series with a second inductor and said second voltage clipping circuit including a second diode being connected in series with a third inductor, said first and second diodes being oppositely poled to provide current conducting paths in opposite directions through said commutating circuit and through one of said voltage clipping circuits; a third and a fourth diode connected in series opposing relationship between said other end of said commutating circuit and said first input conductor, a fifth and a sixth diode connected in series opposing relationship between said other end of the commutating circuit and said second input conductor; a plurality of pairs of shut-off controlled rectifiers, each pair of said shut-off controlled rectifiers connected to one of said junctions of a pair of power controlled rectifiers, one of said shut-off controlled rectifiers of each pair being connected between said third and fourth diodes and the other of said shut-off controlled rectifiers of each pair being connected between said fifth and sixth diodes, whereby when one of said switching controlled rectifiers and one of said shut-off controlled rectifiers are gated conductive a current conducting path is provided which connects said capacitor across one of said power controlled rectifiers to render it nonconductive and said current conducting path also connects said inductive load in series with either of said third and fifth diodes to conduct reactive current when said one power controlled rectifier becomes nonconductive.

3. A power supply system for a polyphase electric motor having polyphase windings, comprising: a source of direct current; a pair of power conductors connected to opposite ends of said source of direct current; an inverter for producing alternate polarity voltages across said polyphase windings; said inverter including a plurality of pairs of series connected power controlled rectifiers connected across said pair of power conductors, a junction intermediate each of said pairs of power controlled rectifiers forming output terminals of said inverter which are respectively connected to said phase windings of said motor; a commutating circuit including a series connected commutating capacitor and inductor for discharging turn-off voltages across said power controlled rectifiers; a pair of switching controlled rectifiers connected across said power conductors and including an intermediate junction connected to one end of said commutating circuit, said pair of switching controlled rectifiers being gated alternately conductive to connect said one end of the commutating circuit to either of said pair of power conductors; a pair of clipping diode circuits each including a series connected diode and an inductor, said pair of clipping diode circuits bypassing predetermined portions of said commutating circuit voltage and current after one of said power controlled rectifiers becomes nonconductive; a pair of reactive diode circuits each including an inductor connected in series with two oppositely poled diodes; said pairs of clipping diode circuits and reactive diode circuits including common ends which are connected together and to an opposite end of said commutating circuit and each pair of circuits further including opposite ends connected across said pair of power conductors; a plurality of pairs of oppositely poled shut-off controlled rectifiers, each of said pairs of shut-off controlled rectifiers having a common end connected to one of said intermediate junctions of said pairs of power controlled rectifiers and being gated conductive to selectively apply said commutating capacitor discharge voltage across each of said power controlled rectifiers, the opposite ends of commonly poled shut-off controlled rectifiers being connected together and respectively connected between said oppositely poled diodes of each of said pair of reactive diode circuits, said inductor and one of said oppositely poled diodes of each pair of reactive diode circuits being respectively included in a unidirectional current path also including the commonly poled shut-off controlled rectifiers of each of said pairs of shut-off controlled rectifiers, the polyphase windings of said motor and a power controlled rectifier, whereby when one of said power controlled rectifiers is rendered nonconductive a current path is provided through one of said pair of reactive diode circuits to conduct reactive current developed in said motor windings.

References Cited

UNITED STATES PATENTS

| | | | |
|---|---|---|---|
| 3,354,370 | 11/1967 | Corry et al. | 321—5X |
| 3,388,310 | 6/1968 | Etter | 321—5 |

FOREIGN PATENTS

| | | |
|---|---|---|
| 1,055,855 | 1/1967 | Great Britain. |

WILLIAM H. BEHA, JR., Primary Examiner

U.S. Cl. X.R.

318—227; 321—45